US011363469B2

(12) United States Patent
Raghavan et al.

(10) Patent No.: US 11,363,469 B2
(45) Date of Patent: Jun. 14, 2022

(54) METHODS AND APPARATUS FOR CODEBOOK SWITCHING WITH DYNAMIC COVERAGE IN A COMMUNICATION SYSTEM

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Kobi Ravid, Closter, NJ (US); Yu-Chin Ou, San Diego, CA (US); Ozge Koymen, Princeton, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/532,579

(22) Filed: Aug. 6, 2019

(65) Prior Publication Data

US 2020/0053575 A1 Feb. 13, 2020

Related U.S. Application Data

(60) Provisional application No. 62/715,377, filed on Aug. 7, 2018.

(51) Int. Cl.
*H04W 4/00* (2018.01)
*H04W 16/28* (2009.01)
(Continued)

(52) U.S. Cl.
CPC .......... *H04W 16/28* (2013.01); *H04B 7/0617* (2013.01); *H04L 25/03942* (2013.01); *H04W 24/02* (2013.01)

(58) Field of Classification Search
CPC ...... H04W 16/00; H04W 16/10; H04W 16/28
See application file for complete search history.

(56) References Cited

U.S. PATENT DOCUMENTS 9,456,427 B1 * 9/2016 Ray ........................ H04W 52/38
2012/0276901 A1 11/2012 Kruglick
(Continued)

FOREIGN PATENT DOCUMENTS

WO WO-2014154277 A1 10/2014
WO WO-2017151876 A1 9/2017

OTHER PUBLICATIONS

International Search Report and Written Opinion—PCT/US2019/045275—ISA/EPO—dated Oct. 24, 2019.

*Primary Examiner* — Omoniyi Obayanju
(74) *Attorney, Agent, or Firm* — Arent Fox, LLP

(57) ABSTRACT

Methods, systems, and devices for wireless communications are described. One method may inlcude a base station or other device estimating an intended coverage area of all possible communication devices that are to be serviced by the base station or other device. The base station or other device may dynamically optimize at least one transmission metric such as a codebook, in response to a change in the coverage area. Another method may include a base station estimating a dynamic coverage area of a set of all possible user equipments or devices to be serviced, and dynamically optimizing a codebook structure in response to a change in the coverage area. Another method may include the base station determining a use-case of the set of all possible user equipments to be serviced by the base station, and hard-coding a metric corresponding to the use case.

27 Claims, 13 Drawing Sheets

(51) Int. Cl.
   *H04B 7/06* (2006.01)
   *H04L 25/03* (2006.01)
   *H04W 24/02* (2009.01)

(56) References Cited

U.S. PATENT DOCUMENTS

| | | | | |
|---|---|---|---|---|
| 2015/0271686 A1* | 9/2015 | Jha | ........................ | H04W 24/02 370/329 |
| 2017/0093470 A1* | 3/2017 | Aust | .................... | H04B 7/0456 |
| 2018/0145855 A1* | 5/2018 | Chaudhuri | .............. | H04L 1/004 |
| 2018/0262918 A1* | 9/2018 | Zhao | .................... | H04B 7/0695 |

* cited by examiner

METHODS AND APPARATUS FOR CODEBOOK SWITCHING WITH DYNAMIC COVERAGE IN A COMMUNICATION SYSTEM

CLAIM OF PRIORITY

This application claims the benefit of U.S. Provisional Application Ser. No. 62/715,377 entitled "METHODS AND APPARATUS FOR CODEBOOK SWITCHING WITH DYNAMIC COVERAGE IN A COMMUNICATION SYSTEM" and filed on Aug. 7, 2018, which is expressly incorporated by reference herein in its entirety.

TECHNICAL FIELD

Certain aspects of the present disclosure generally relate to wireless communications and, more particularly, to techniques for codebook switching with dynamic coverage in a wireless communications system.

INTRODUCTION

Wireless communications systems are widely deployed to provide various types of communication content such as voice, video, packet data, messaging, broadcast, and so on. These systems may be capable of supporting communication with multiple users by sharing available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as millimeter wave (mmW) or other systems that use beamforming, a base station may communicate with a UE using multiple antennas. Directional beamforming codebooks may be used at both ends of a communication link between a transmitting and receiving device (e.g., a base station and a UE). A base station may offer service to multiple potential UEs in certain coverage or service areas. UE coverage or service areas may change dynamically over time. A base station may switch codebooks based on changes in coverage/service area or UEs served.

BRIEF SUMMARY

Techniques described below relate to improved methods, systems, devices, or apparatuses that support codebook switching with dynamic coverage in mmW communications systems. In 5G or mmW systems, base stations and UEs may be configured with multiple antennas and corresponding directional beamforming codebooks. A base station or other device may estimate an intended coverage area of all possible communication devices that are to be serviced by the base station or other device. The base station or other device may dynamically optimize at least one transmission metric such as a codebook, in response to a change in the coverage area.

In examples, methods are disclosed for estimating a dynamic coverage area of a set of all possible user equipments or devices to be serviced, and dynamically optimizing a codebook structure in response to a change in the coverage area. In some cases, estimating the dynamic coverage area of a set of all possible user equipment or devices to be serviced further comprises determining a use-case of the set of all possible user equipments to be serviced by the base station, and hard-coding a metric corresponding to the use case.

In some cases, estimating the dynamic coverage area is based on signaling received from at least one second base station capable of establishing communication with a subset of the set of all possible UEs to be serviced by the first base station. In some cases, estimating is based on at least one of handover statistics or link loss statistics due to blockage. In some examples, dynamically optimizing the at least one transmission metric is based on determining a subset of the set of all possible UEs to be serviced by the first base station.

In some cases, determining the subset of the set of all possible UEs based on one of a priority parameter or differential performance gains or cost associated with transmissions or their relative locations to the base-station. In some examples, dynamically optimizing the at least one transmission metric further comprises dynamically loading to memory, an optimal codebook for use in communication, and discovering new UEs in an intended coverage area corresponding to the loaded codebook.

In some cases, dynamically optimizing the at least one transmission metric is a function of at least one parameter selected from the group consisting of the base station antenna dimensions, the coverage area, and a metric capturing the performance of the codebook. In some cases, the metric capturing the performance of the codebook is at least one of a mean array gain, a worst-case array gain, or a certain percentile in the distribution function of the array gain over the coverage area.

An apparatus for wireless communication is described. The apparatus may include means for estimating a dynamic coverage area of a set of all possible user equipments or devices to be serviced and means for dynamically optimizing a codebook structure in response to a change in the coverage area. In some cases, the means for estimating the dynamic coverage area of a set of all possible user equipment or devices to be serviced further comprises means for determining a use-case of the set of all possible user equipments to be serviced by the base station and means for hard-coding a metric corresponding to the use case. In some cases, the means for estimating the the dynamic coverage area is based on signaling received from at least a second base station capable of establishing communication with a subset of the set of all possible UEs to be serviced by the first base station.

In some examples, the means for estimating is based on at least one of handover statistics or link loss statistics due to blockage. In some examples, means for dynamically optimizing the at least one transmission metric is based on means for determining a subset of the set of all possible UEs to be serviced by the first base station. In some cases, the gmeans for determining the subset of the set of all possible UEs is based on one of a priority parameter or differential performance gains or cost associated with transmissions or their relative locations to the base-station.

In some examples, the means for dynamically optimizing the at least one transmission metric further comprises means for dynamically loading to memory, an optimal codebook for use in communication, and discovering new UEs in an intended coverage area corresponding to the loaded codebook. In some cases, the means for dynamically optimizing the at least one transmission metric is a function of at least one parameter selected from the group consisting of the base station antenna dimensions, the coverage area, and a metric capturing the performance of the codebook. In some cases, the metric capturing the performance of the codebook is at least one of a mean array gain, a worst-case array gain, or a certain percentile in the distribution function of the array gain over the coverage area.

Another apparatus for wireless communication is described. The apparatus may include a processor, memory in electronic communication with the processor, and instructions stored in the memory. The instructions may be operable to cause the processor to to estimate a dynamic coverage area of a set of all possible user equipments or devices to be serviced, and dynamically optimize a codebook structure in response to a change in the coverage area. In some cases, the instructions operable to cause a processor to estimate the dynamic coverage area of a set of all possible user equipment or devices to be serviced further comprises instructions operable to cause a processor to determine a use-case of the set of all possible user equipments to be serviced by the base station, and hard-code a metric corresponding to the use case.

In some cases, the instructions are operable to estimate the the dynamic coverage area based on signaling received from at least a second base station capable of establishing communication with a subset of the set of all possible UEs to be serviced by the first base station. In some cases, the instructions may be operable to estimate the dynamic coverage area based on at least one of handover statistics or link loss statistics due to blockage. In some examples, the instructions may be operable to dynamically optimize the at least one transmission metric based on determining a subset of the set of all possible UEs to be serviced by the first base station.

In some cases, the instructions may be operable to cause the processor to determine the subset of the set of all possible UEs based on one of a priority parameter or differential performance gains or cost associated with transmissions or their relative locations to the base-station. In some examples, the instructions may be operable to cause the processor to dynamically load to memory, an optimal codebook for use in communication, and discover new UEs in an intended coverage area corresponding to the loaded codebook. In some cases, the instructions may be operable to cause the processor to dynamically optimize the at least one transmission metric as a function of at least one parameter selected from the group consisting of the base station antenna dimensions, the coverage area, and a metric capturing the performance of the codebook.

A non-transitory computer-readable medium for wireless communication is described. The non-transitory computer-readable medium may include instructions operable to cause a processor to estimate a dynamic coverage area of a set of all possible user equipments or devices to be serviced, and dynamically optimize a codebook structure in response to a change in the coverage area. In some cases, the non-transitory computer-readable medium may include instructions operable to cause a processor to determine a use-case of the set of all possible user equipments to be serviced by the base station, and hard-code a metric corresponding to the use case.

In some cases, the non-transitory computer-readable medium may include instructions operable to cause a processor to estimate the dynamic coverage area based on signaling received from at least a second base station capable of establishing communication with a subset of the set of all possible UEs to be serviced by the first base station. In some cases, the non-transitory computer-readable medium may include instructions operable to cause a processor to estimate the dynamic coverage area based on at least one of handover statistics or link loss statistics due to blockage. In some cases, the non-transitory computer-readable medium may include instructions operable to cause a processor to dynamically optimize the at least one transmission metric based on determining a subset of the set of all possible UEs to be serviced by the first base station.

In some examples, the non-transitory computer-readable medium may include instructions operable to cause a processor to determine the subset of the set of all possible UEs based on one of a priority parameter or differential performance gains or cost associated with transmissions or their relative locations to the base-station. In some cases, the non-transitory computer-readable medium may include instructions operable to cause a processor to dynamically optimize the at least one transmission metric and further comprises instructions operable to cause a processor to dynamically load to memory, an optimal codebook for use in communication, and discovering new UEs in an intended coverage area corresponding to the loaded codebook, etc While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
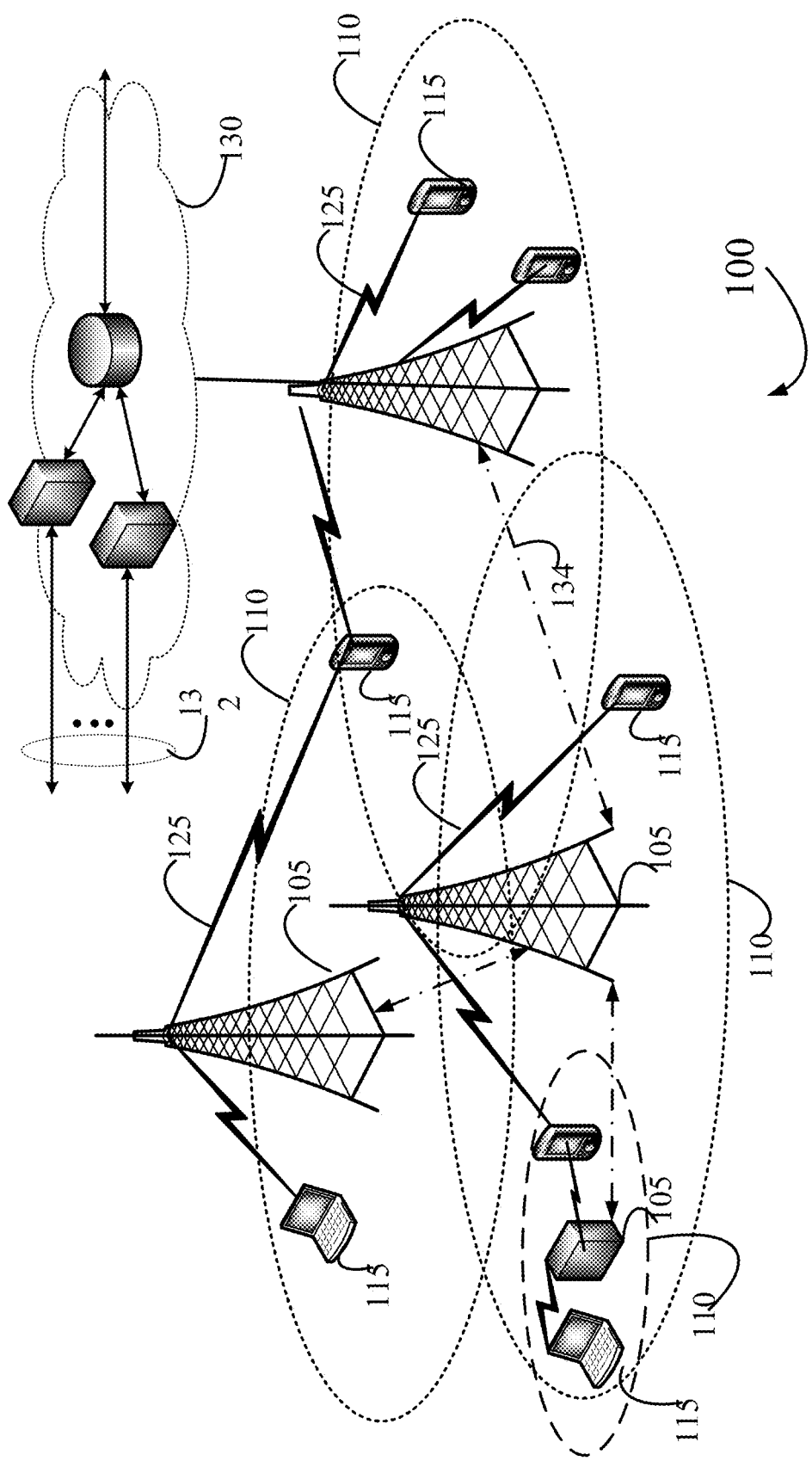
FIG. 1 illustrates an example wireless communication system 100 that supports techniques for codebook switching with dynamic coverage in accordance with aspects of the present disclosure.

In 5G or millimeter wave (mmW) communication systems, transmitting and receiving devices (e.g. base stations and UEs) are configured with multiple antennas, which may be used for beamformed (e.g., directional) transmissions. UEs may be configured with a number of antenna sub-arrays. A base station may offer service to multiple potential UEs in certain coverage or service areas. A base station may estimate an intended coverage area of all possible UEs that may be serviced by the base station. Codebooks corresponding to directional steering may be used at both ends of a communications link (e.g., at a base station and UE for directional beamforming).

For mmW base stations, using a single codebook may assume a static coverage area. However, a coverage or service area may change dynamically over time. In some examples, coverage policies may change with time. In some cases, a base station may use only a subset of antennas for transmission (e.g., due to power constraints or regulatory reasons) necessitating a need to switch a transmission metric such as a codebook or the codebook's properties. A base station may dynamically optimize at least one transmission metric such as a codebook or its properties, in response to changes in the coverage area or due to a change in coverage policies. There exists a need for dynamic and effective codebook switching at a mmW base station (or gNB) or customer premises equipment (CPE) or UE, in accordance with dynamic changes in coverage area.

In some examples, a base station may estimate an intended coverage area of all possible UEs that may be serviced by the base station and dynamically optimize at least one transmission metric in response to a change in the coverage area.

In some cases, the base station may determine a use-case of the set of all possible user equipments to be serviced by the base station, and hard-code a metric corresponding to the use case. In some cases, a base station may estimate the dynamic coverage area based on signaling received from at least a second base station capable of establishing communication with a subset of the set of all possible UEs to be serviced by the first base station. In some cases, determining the subset of the set of all possible UEs is based on one of a priority parameter or differential performance gains or cost associated with transmissions or their relative locations to the base-station.

In some cases, a base station may estimate a coverage area based on at least one of handover statistics or link loss statistics due to blockage. In some examples, dynamically optimizing the at least one transmission metric is based on determining a subset of the set of all possible UEs to be serviced by the first base station. In some examples, dynamically optimizing the at least one transmission metric further comprises dynamically loading to memory, an optimal codebook for use in communication, and discovering new UEs in an intended coverage area corresponding to the loaded codebook. In some cases, dynamically optimizing the at least one transmission metric is a function of at least one parameter selected from the group consisting of the base station antenna dimensions, the coverage area, and a metric capturing the performance of the codebook.

In some cases, the metric capturing the performance of the codebook is at least one of a mean array gain, a worst-case array gain, or a certain percentile in the distribution function of the array gain over the coverage area.

In some examples, a user device or user equipment may estimate a dynamic coverage area of a set of all possible user equipments or devices to be serviced, and dynamically optimize a codebook structure in response to a change in the coverage area.

Aspects of the disclosure are initially described in the context of a wireless communications system. Aspects of the disclosure are further illustrated by a process flow. Aspects of the disclosure are further illustrated by and described with reference to apparatus diagrams, system diagrams, and flowcharts that relate to techniques for codebook switching with dynamic coverage in a communication system.

FIG. 1 illustrates an example of a system 100 for wireless communications in accordance with various aspects of the present disclosure. The system 100 includes base stations 105, UEs 115, and a core network 130. In some examples, the system 100 may be a Long Term Evolution (LTE) network, an LTE-Advanced (LTE-A) network, an LTE-A Pro network, or a New Radio (NR) network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, communication links 125 between a base station 105 and a UE 115 may utilize one or more carriers. Communication links 125 shown in the system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

A geographic coverage area 110 for a base station 105 may be divided into sectors making up only a portion of the geographic coverage area 110. Each sector may be associated with a cell. For example, each base station 105 may provide communication coverage for a macro cell, a small cell, a hot spot, or other types of cells, or various combinations thereof. In some examples and applications, a base station 105 may be mobile and therefore provide communication coverage for a moving geographic coverage area 110.

In some examples, different geographic coverage areas 110 associated with different technologies may overlap and overlapping geographic coverage areas 110 associated with different technologies may be supported by the same base station 105 or by different base stations 105. The system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., massive machine-type communication (mMTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as mMTC or IoT devices, may be low cost or low complexity devices, and may provide for automated communication between machines (e.g., via Machine-to-Machine (M2M) communication). M2M communication or mMTC may refer to data communication technologies that allow devices to communicate with one another or a base station 105 without human intervention.

In some examples, M2M communication or mMTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an 51 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW).

The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g. less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz multiple industrial, scientific, and medical (ISM) bands, which may be used opportunistically by devices that can tolerate interference from other users.

System 100 may also operate in an extremely high frequency (EHF) region of the spectrum (e.g., from 30 GHz to 300 GHz), also known as the millimeter band. In some examples, system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115.

The propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may leverage signal transmissions over multipath to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth. The system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. In some examples, NR shared spectrum may increase spectrum utilization and spectral efficiency, specifically through dynamic vertical (e.g., across frequency) and horizontal (e.g., across time) sharing of resources.

In wireless communications systems, Quality of Service (QoS) may refer to a capability of a wireless network or device to provide service at a certain level of performance, reliability, usability, etc. QoS may relate to coverage, audio/video quality, accessibility, etc.

In some examples of the wireless communication system 100, a UE 115 may estimate a dynamic coverage area of a set of all possible devices to be serviced. In some examples of the wireless communication system 100, a UE 115 may estimate a dynamic coverage area of a set of all possible devices to be serviced and may optimize a codebook structure in response to a change in coverage area.

Figure 2:
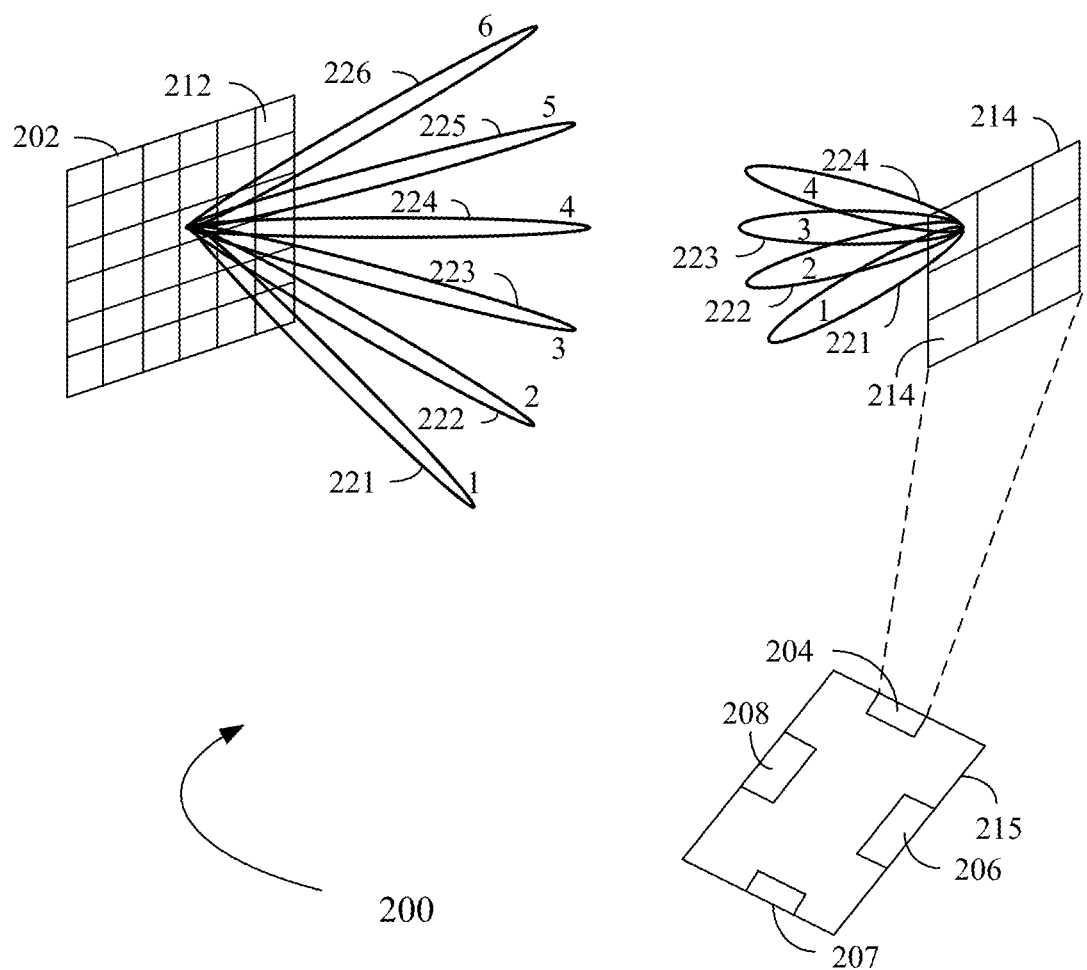
FIG. 2 illustrates an example of a wireless communication system 200 that supports techniques for codebook switching with dynamic coverage in accordance with aspects of the present disclosure.

FIG. 2 illustrates an example of a wireless communication system 200 that supports techniques for codebook switching with dynamic coverage in accordance with aspects of the present disclosure. In some examples, the wireless communication system may implement aspects of beamforming in a high-frequency wireless communication system such as a mmW system. The communication system 200 may comprise a base station (not shown) having a base station antenna array 202. In an example, the antenna array 202 may include a number of antenna elements (e.g., antenna element 212) arranged in a planar grid pattern. The communication system 200 may also comprise a UE 215 that has a number of antenna arrays, sometimes referred to as sub-arrays. Antenna sub-arrays 204, 206, 207 and 208 are shown for exemplary purposes only. A UE antenna array or sub-array may include a number of antenna elements (e.g., antenna element 214) arranged in a grid (linear or planar) pattern.

In FIG. 2, base station antenna array 202 is shown as generating six (6) communication beams 221, 222, 223, 224, 225 and 226, also labeled 1 through 6. UE antenna array 204 is shown as generating four (4) communication beams 221, 222, 223, and 224, also labeled 1 through 4. It is understood that the antenna array 202 and the antenna array 204 are capable of generating many more communication beams than the communication beams shown in FIG. 2. Communication beams generated by the antenna array 202 and the antenna array 204 are capable of generating transmission and reception communication beams.

Figure 3:
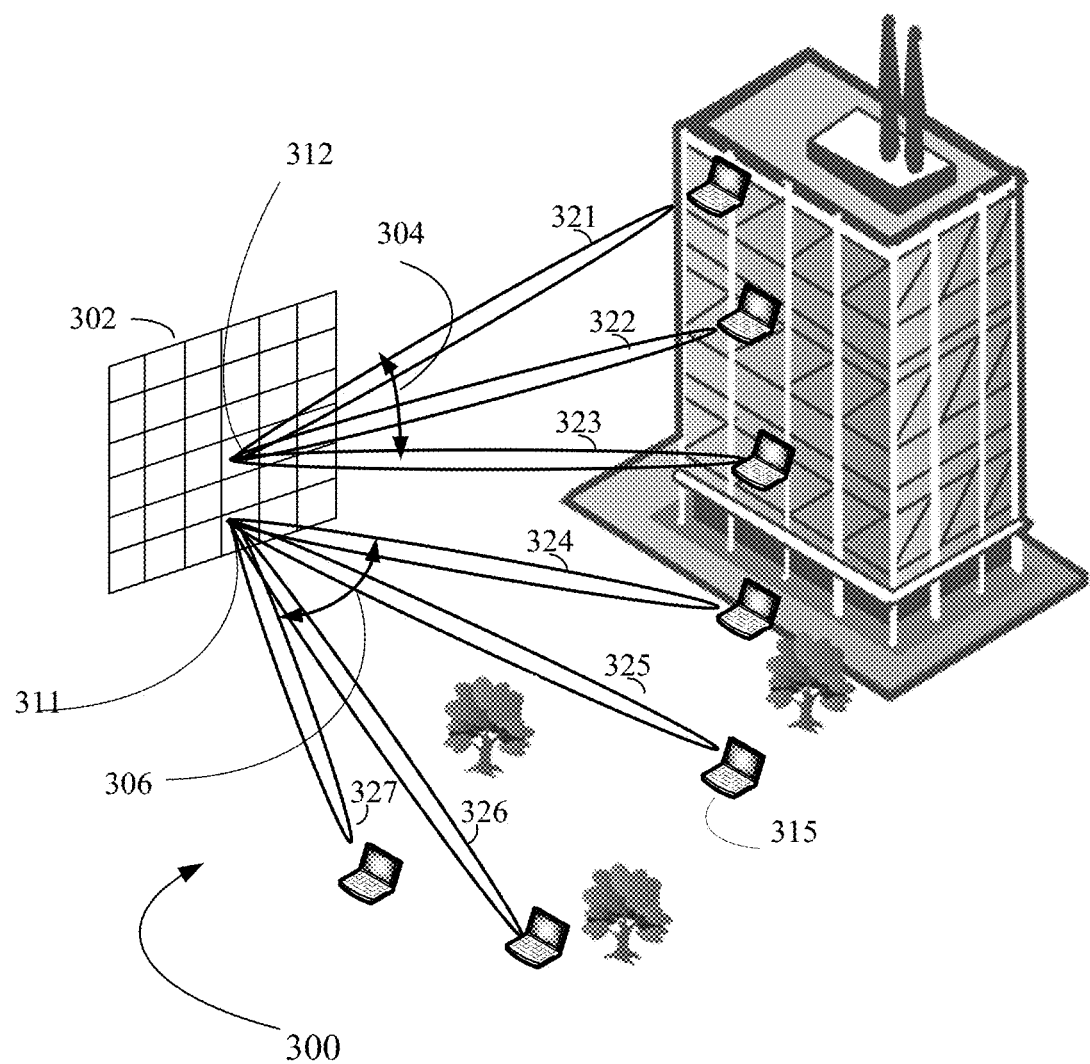
FIG. 3 illustrates an example of a wireless communication system 300 that supports techniques for codebook switching with dynamic coverage in accordance with aspects of the present disclosure.

FIG. 3 illustrates an example of a wireless communication system 300 that supports techniques for codebook switching with dynamic coverage in accordance with aspects of the present disclosure. Communication system 300 may comprise a base station (not shown) having a base station antenna array 302. Base station antenna array 302 may include a number of antenna elements arranged in a grid pattern. As illustrated, base station antenna element 312 may generate communication beams 321, 322 and 323. Base station antenna element 311 may generate communication beams 324, 235, 326, 327. The number of beams represented by base station antenna array 302 are for exemplary purposes only. It is understood that base station antenna array 302 may generate any number of beams.

Communication beams generated by a base station 302 may provide coverage to users or UEs in a particular location or coverage area over a specific elevation and azimuth. For instance, as illustrated in FIG. 3, communication beams 321, 322 and 323 may provide coverage to users over several floors of a tall building (e.g. an office building) at a certain angle of elevation 304. Communication beams 324, 235, 326 and 327 may provide coverage to users or UEs including e.g., pedestrians or cars on the ground level at a certain azimuth 306.

In some cases, a base station may not be providing service in the most effective manner. For instance, a base station may have a larger coverage area than necessary, and may scan areas without UEs present. This may result in an unneccesary waste of base station energy, time and other system resources. Alternatively, the coverage area of a base station may not be large enough. This may result in too many UEs reporting failures, not receiving good service, or falling back to other networks, e.g., LTE, sub-6 NR, etc.

In examples, the coverage area of a base station 302 may be dynamic. A base station may need to transmit fewer communication beams during specific time segments or may need to adapt the elevation and azimuth area of coverage according to need. As an example, a base station may cover a 120 degree azimuth by 90 degree elevation area providing service to users on all floors and in a courtyard of a high-rise office building. During work hours such coverage may be necessary to meet the demand of office workers. However, there may be a reduced requirement for service e.g., on a weekend, or at night or in typical non-office hours, when fewer users need service.

In some examples, the coverage area of a base station 302 may be dynamic because the base station is mobile. For instance, a base station or other device providing service may be located in a blimp or drone, or other moving apparatus (e.g., a slowly rotating installation in a stadium overhang). Thus, the coverage area associated with the base station or other device may change over time.

Thus, there is a need for a base station to estimate its coverage area, or to adjust its beamforming according to user requirements, or to adjust its coverage area in response to changes in the demand for service.

In some examples, a base station may estimate a coverage area based on information hard-coded in software. Such an input could be user driven. For example, a base station may be hard-coded with time of day policies, e.g., a base station may be hard-coded to provide certain coverage from 9 AM to 5 PM to cover a first region, and different coverage from 5 PM until 9 AM. In examples, a requirement for service may be in response to a special event. For instance, during a sporting event, music festival, etc. coverage needs may be highly dynamic. This information may be hard-coded in the software of the base station or other device.

In some examples, if a base station resource is constrained, it may focus on an intended coverage area of a select subset of UEs. For instance, in some examples, if a base station determines it is communicating with more UEs that are located in a certain geographical or physical area, the base station may assign a higher priority to UEs originating in this area. A base station may determine a general location of served UEs at a particular time based on system information such as MIB and SIB. In some cases, a base station may determine a UE is attaching to it and the base station may determine an approximate location of the UE (in some cases within one or two meters) based on MIB or SIB feedback. A base station may determine UE location based on some other kind of UE feedback. In some examples, prioritized UEs may be the largest number of UEs with significant performance improvement, (e.g., cell edge UEs can see significant performance improvement with a small improvement in coverage area and may thus be highly prioritized).

In some examples, a base station may determine a set of UEs it is serving and a geographical location it covers and may communicate this information to other base stations. These other base stations may possibly be servicing the same or a similar geographical area. A base station may communicate directly with another base station over the backhaul link (e.g., a sub-6 NR or mmW or LTE link) to indicate it is providing coverage to a particular sector or coverage area. If there is overlap in coverage area between the two base stations, a backhaul based policy may be established. An example of such a policy may be a resolution mechanism across the two base stations as to which area either base station serves. In this specific example, the resolution may be deterministic or time-varying or even stochastic. In some cases, estimation of a coverage area may be based on handover statistics or other related metrics. Thus, similarly located gNBs may focus on providing service to whatever area they should cover with knowledge of what other gNBs are doing.

In some examples, a base station may adapt its intended coverage area based on information received from neighboring base stations (e.g., over a backhaul link) or based on information received indirectly (e.g., via a core network) or from a network box that relays information beyond neighboring base stations. A network box or some other device may estimate a dynamic coverage area of a set of all possible UEs to be serviced. The network box or other device may have several antennas or antenna modules that enable several base stations that are similarly located to communicate with the device and with each other to determine UE locations. The network device or box may estimate coverage area based on the presence of UEs, UE locations or a requirement for service.

Figure 4:
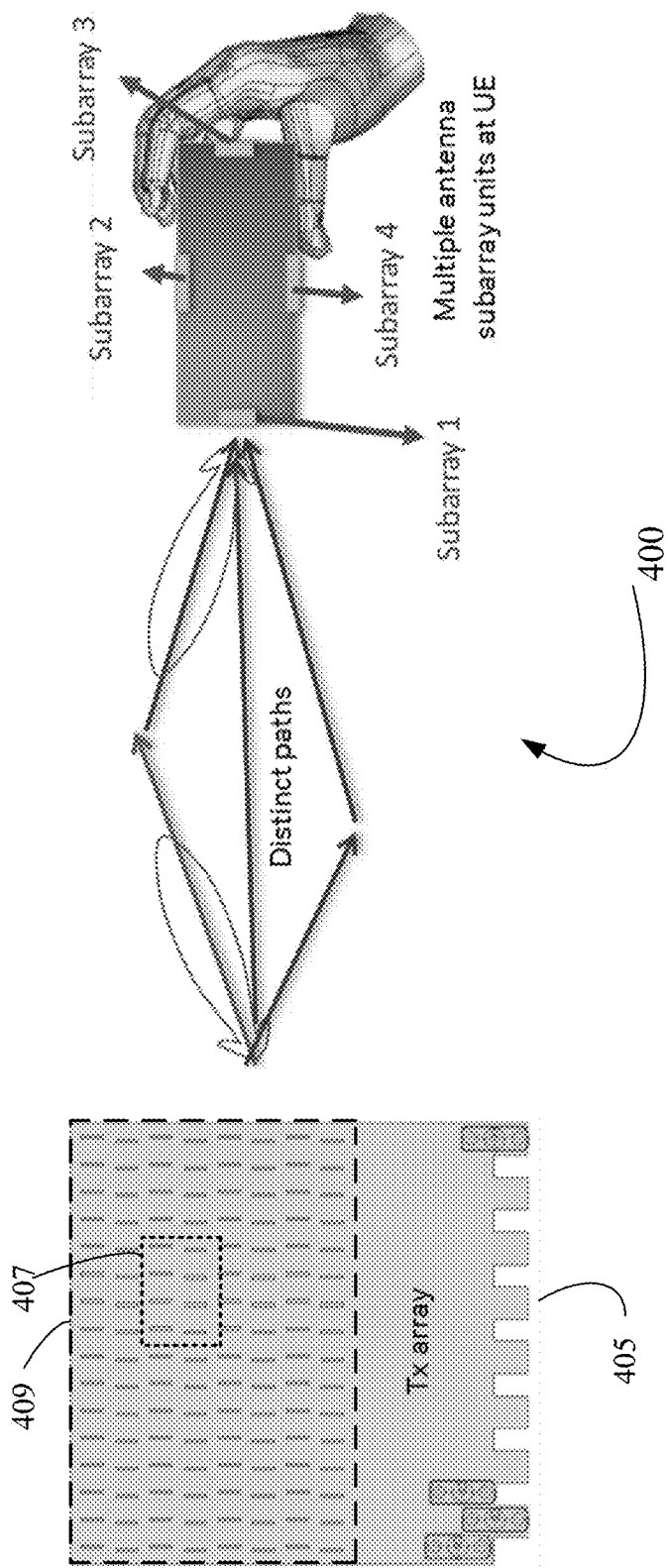
FIG. 4 illustrates an example of a wireless communication system 400 that supports techniques for codebook switching with dynamic coverage in accordance with aspects of the present disclosure.

Upon estimating its coverage area, a base station may determine an antenna configuration to use for communication with the UEs. FIG. 4 illustrates an example base station 405 comprising an antenna array of 16×8 antennas 409. The base station 405 may comprise any configuration of antennas (e.g., 32×8, 32×16, 8×16, 16×8, etc.). In some examples, a base station 405 may utilize a subset of an antenna array, e.g., base station 405 may utilize a 4×2 antenna array 407 comprised in the 16×8 array 409. Subarray 407 is a subset of the full set of base station antennas. In some examples, a base station may periodically transmit over different subsets of antennas. In some examples, a UE or UEs in communication with the base station 405 may have multiple antenna subarray units (e.g., subarray 1, subarray 2, subarray 3 and subarray 4).

In some examples, the number of antennas or the antenna array configuration utilized by a base station may depend on an intended coverage area of the base station. In other words, a base station may select a certain configuration of antenna arrays for use in communication with target UEs in a geographic area. This geographic area may correspond to a certain elevation and azimuth. As such, a base station may determine to use "N" antennas in elevation and "M" antennas in azimuth to communicate with UEs located in that elevation and azimuth. For purposes of illustration, suppose a base station utilizes 16 antennas in elevation and 8 antennas in azimuth. If the base station determines to cover a different area, the base station may adjust its usage, e.g., to utilize 16 antennas in azimuth and 8 antennas in elevation.

In some examples, a base station or base stations may determine to use an antenna configuration that provides coverage for all users or UEs in a coverage area, including a worst-case user. In some examples, a base station or base stations may determine to use an antenna configuration that provides best coverage to the median user or UE in the coverage area. In some examples, a base station or base stations may determine to use an antenna configuration that provides best coverage to users over a mean coverage area. Thus, different solutions are provided depending on the base station objective, which may be pre-defined or dynamically determined.

In an aspect of disclosed examples, a codebook of beams may be utilized at a transmitting and receiving device. For instance, a base station and a UE in communication with each other may each utilize a codebook of beams. The receiver may have a codebook for specifying precoding matrices for use in MIMO transmissions. Precoding ensures multiple data streams emitted from transmit antennas are appropriately weighted and independent, such that link throughput is maximized at the receiver output. A receiver may measure channel conditions between transmit and receive antennas based on reference signals transmitted from multiple antennas in a transmitter. A receiver may select a codebook index suitable for the measured channel conditions from stored codebooks and transmit the selected codebook index as feedback information to the transmitter. Upon receipt of the feedback information, the transmitter may perform precoding based on phase and/or gain information contained in the codebooks. Codebooks represent both phase and gain information.

In examples, each beam in a codebook may have a directional orientation covering a neighboring direction of another beam. For instance, a codebook of 32 beams may cover a 120×30 degree region wherein each of the 32 beams covers a directional portion of the entire region. In other words, each of the 32 beams covers a different direction and all these directions put together cover the 120×30 degree coverage area. Additionally, each codebook may be configured differently, depending on an intended coverage area.

In some examples, a base station may estimate a dynamic coverage area of a set of all possible UEs to be serviced and may dynamically optimize a codebook structure in response to a change in the coverage area. In some examples, a base station may determine an optimum codebook and beam configuration to use. For instance, a base station may estimate that 8 beams are needed and that the 8 beams are required to provide coverage in one azimuth plane, or 4 beams are needed in azimuth and 1 in elevation plane, or 2 beams are needed in azimuth and 4 in elevation, etc.

Codebook structure selected by the base station depends on the objective of the base station. Disclosed examples provide for dynamic codebook switching based on a determination or estimation of an intended coverage area. Thus, optimum coverage for a 120 by 90 area may use one codebook, coverage for a 120 by 30 area may require use of another codebook, etc. In some examples, depending on the intended coverage area of a base station, its antenna dimensions and intended design metrics, different beam scanning codebooks may be optimally used for secondary synchronization signal block phase 1 (SSB/P-1) scanning.

In some examples, an appropriate codebook may optimize cumulative distribution function (CDF) statistics of array gain in a coverage area in different ways. Example candidate objective functions may include worst-case array gain, mean array gain, or an $x^{th}$ percentile of array gain (e.g. $80^{th}$, $50^{th}$, $20^{th}$, etc percentiles.)

Figure 5B:
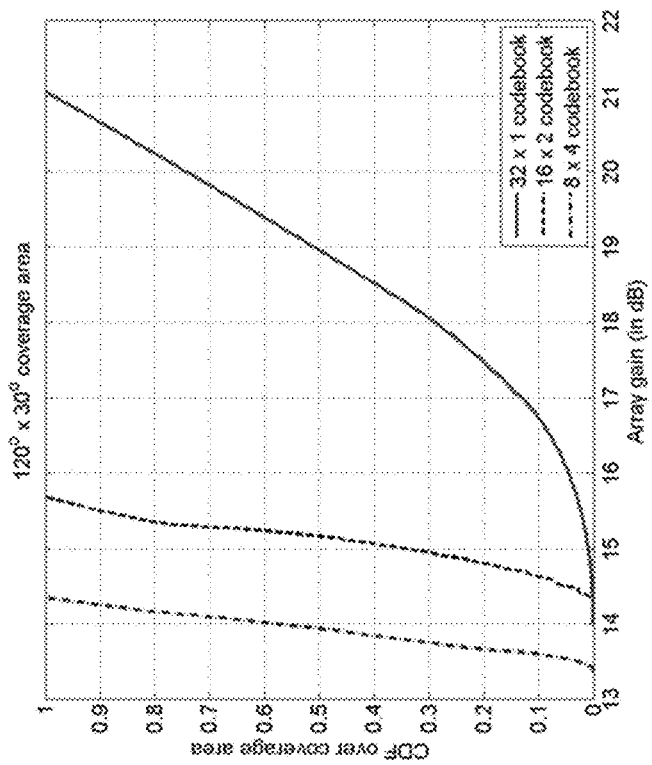
FIGS. 5A and 5B illustrate example use cases that support techniques for codebook switching with dynamic coverage in accordance with aspects of the present disclosure.
Figure 5A:
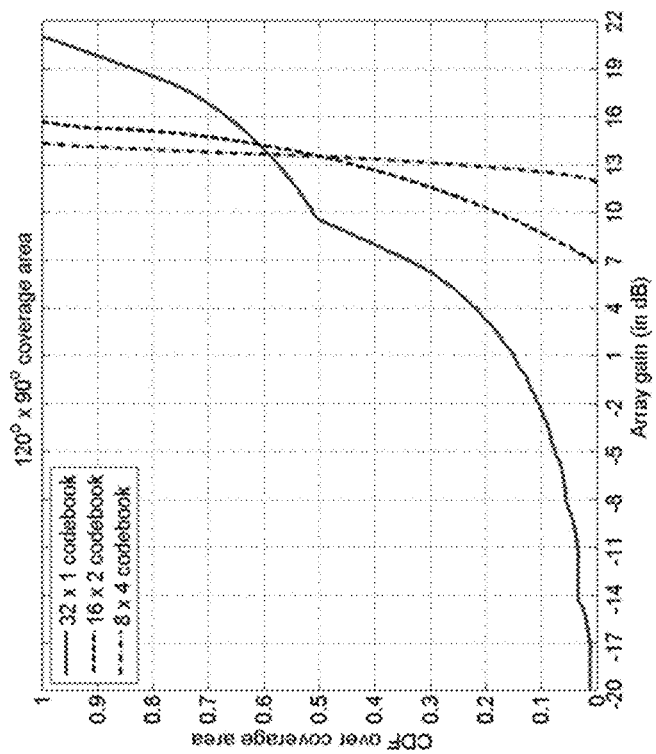

FIGS. 5A and 5B illustrate example use cases that support techniques for codebook switching with dynamic coverage in accordance with aspects of the present disclosure. As illustrated in the graphs of FIGS. 5A and 5B, the solid line represents a 32×1 codebook, the dashed line represents a 16×2 codebook and the dashed and dotted line represents an 8×4 codebook. The y-axis represents CDF over coverage area and the x-axis represents array gain in dB. For illustrative purposes, it is assumed an exemplary base station represented in FIGS. 5A and 5B has a 32×4 planar array for transmissions, i.e., 32 antennas in the azimuth and 4 antennas in the elevation. In FIG. 5A (case 1), the exemplary base station covers a 120×90 (azimuth by elevation) area. In FIG. 5B (case 2), the exemplary base station covers a 120×30 (azimuth by elevation) region. Further, a codebook of size 32 is assumed in both FIGS. 5A and 5B. In other words, the exemplary base station scans through 32 beams. The base station may perform any configuration of scanning, but for illustration only, three codebooks are discussed in examples below.

In FIG. 5A, using the 32×1 codebook, the base station may scan through 32 beams in the azimuth plane and all 32 beams scan in one elevation scanning direction. Here, the base station coverage area is 90 degrees in elevation, but all 32 beams are pointed at the same elevation plane.

Using the 16×2 codebook, 16 beams may scan the azimuth plane in two elevation scanning directions. For instance, the 90 degree region may be broken into 2 elevation planes. A first base station scanning may cover −45 to zero degrees with one set of 16 beams and a second scanning may cover zero to 45 degrees with another set of 16 beams.

Using the 8×4 codebook, 8 beams may scan the azimuth plane in four elevation scanning directions. For instance, the 90 degree region may be broken into 4 elevation planes. Thus, the base station may scan 8 azimuth beams from −45 to −22.5 degrees in elevation, then scan from −22.5 to zero degrees using 8 azimuth beams, then scan from zero to 22.5 through another 8 azimuth beams, and then scan through another 8 beams over 22.5 to 45 degrees.

In the illustration of FIG. 5A, all three codebooks take the same amount of time, but resources are allocated differently in terms of azimuth and elevation partitioning.

FIG. 5A, illustrates the exemplary array gain of each of the three codebooks used for the 120×90 degree region. As illustrated, the 32×1 codebook provides good coverage over the azimuth plane, but not over the elevation space. As illustrated, there is good performance at the top few percentile points, starting with a gain of about 21 dB. However, there may be poor performance towards the tail. This codebook shows quick decay and gains in the range of −25 dB. This is similar to a single antenna use case which may result in a zero dB array gain.

The 16×2 codebook improves coverage over the elevation plane at the cost of azimuth coverage. This codebook starts with poorer performance at the top of the CDF curve, but does not deteriorate as badly as the first codebook. The array gain range is from about 7 dB to about 15 dB.

As illustrated, the 8×4 codebook provides further improvement in elevation coverage over the 16×2 codebook, showing approximately a 5 dB worst gain in performance.

Thus, in the example illustrated in FIG. 5A, the 8×4 codebook is better than the 16×2 codebook from a mean gain standpoint by approximately 0.75 dB. The 8×4 codebook is better than the 16×2 codebook from a worst-case standpoint by approximately 5 dB. Thus, in this scenario, it is optimal to use the 8×4 codebook to cover a 120×90 degree coverage area.

A 32×1 codebook may not be the best codebook to use if UEs are expected to be dispersed over the entire 120×90 degree region. The 8×4 codebook may be the optimum codebook to use if the base station is targeting the median user or UE. If the base station is targeting for instance, the top 10 percent best UEs then the 16×2 codebook may be the best codebook to use. Thus, the optimum codebook choice may depend on the base station objective.

In FIG. 5B, the coverage area is reduced from a 120×90 area to a 120×30 degree coverage area. Using the 32×1 codebook, the base station may scan through 32 beams in the azimuth plane in one elevation scanning direction. Here, the base station coverage area is 30 degrees in elevation and all 32 beams scan the azimuth plane over this elevation downtilt. In other cases, the base station may scan through any different number of beams.

Using the 16×2 codebook, 16 beams may scan the azimuth plane in two elevation scanning directions. Using the 8×4 codebook, 8 beams may scan the azimuth plane in four elevation scanning directions. As illustrated, the 32×1 codebook provides good coverage over the azimuth plane, but not over the elevation space. The 16×2 codebook improves coverage over the elevation plane at the cost of azimuth coverage. The 8×4 codebook provides further improvement in elevation coverage over the 16×2 codebook.

In the example illustrated in FIG. 5B, the 16×2 codebook leads to a minor (approximately 0.3 dB) worst-case array gain improvement, but at the cost of significant loss (greater than 3 dB) in mean gain. The 8×4 codebook does not perform better in this example. Thus, the 32×1 codebook would be the optimal choice to cover the 120×30 degree region in the example of FIG. 5B.

In an aspect of disclosed examples, the adaptation of a base station or other transmitting device to a dynamic coverage area may require the dynamic uploading of different codebooks to device (e.g. base station) memory. A base station may store a codebook in fast memory so that the codebook may be accessed with a quick turn around time. A codebook may need to be accessed at a granularity corresponding to each symbol in a secondary synchronization block. This may require a frequency as fast as every few microseconds, or even quicker, depending on subframe structure. If codebooks are stored in slow memory, access may take up to a few ms and this may hinder the dynamic loading of codebooks at an optimum speed.

A base station may have limited fast memory in terms of beam codebook storage, so not all possible codebooks may be stored in memory. Even if fast memory capacity is reasonable, there may be a vast number of codebook combinations at the base station that would disallow storing all codebooks in fast memory. In some examples, if fast memory is large enough to allow storage of all possible codebooks, the correct codebook from fast memory for P-1 sweeping still needs to be determined. Such a determination may be based on a priori beam codebook design studies which are then hard-coded in terms of design tradeoff lookup tables from which the correct codebook is selected based on the current choice of design objectives.

In some examples, a base station or other device may prioritize codebooks to store in fast memory and codebooks to store offline, or in slow memory. For example, in the 120×90 coverage region example described earlier, the 16×2 and 8×4 codebooks could be stored in fast memory. On the other hand, in the 120×30 coverage region example described earlier, the 32×1 and 16×2 codebooks could be stored in fast memory. These two codebook choices in these two examples provide the best possible choices in terms of a design tradeoff. In the first example, the 32×1 codebook serves as a poor choice with any reasonable design objective since the elevation area to be scanned is wide (90 degrees) and the 32×1 codebook leads to poor performance in the elevation region. Similarly, in the second example, the 8×4 codebook serves as a poor choice with any reasonable design objective since the narrow elevation coverage required (30 degrees) ensures that an 8×4 codebook oversamples the elevation region than necessary.

In some examples, a base station may use a smaller set of antenna dimensions to save power. In some examples, regulatory constraints may require the use of a smaller set of antenna dimensions. For example, such situations could arise due to exceeding the EIRP constraints for mmW transmissions due to the increase in array gain with large arrays. Such a condition may necessitate the reduction in antenna array size for effective transmissions that still meet regulatory constraints. In this case, the optimal codebook to use may be a function of current antenna dimensions.

Figure 6:
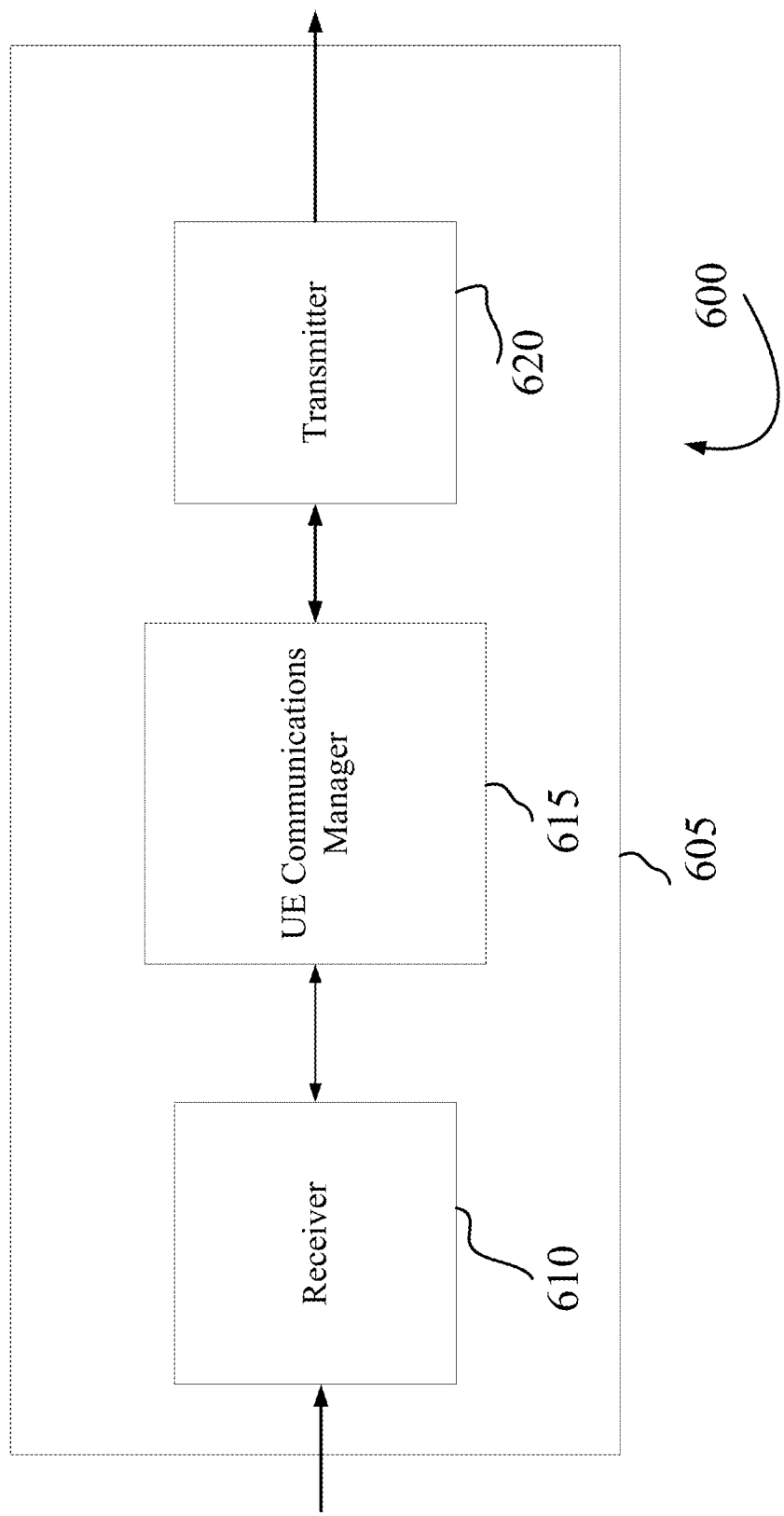
FIG. 6 illustrates a block diagram of a system including a UE that supports techniques for codebook switching with dynamic coverage in accordance with aspects of the present disclosure.

FIG. 6 illustrates an example block diagram that supports techniques for codebook switching with dynamic coverage in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to CQI reporting, throughput indicators, priority indicators, etc.) Information may be passed on to other components of the device. The receiver 610 may be an example of aspects of the transceiver 835 described with reference to FIG. 8. The receiver 610 may utilize a single antenna or a set of antennas.

UE communications manager 615 and/or at least some of its various sub-components may be implemented in hardware, software executed by a processor, firmware, or any combination thereof If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may estimate a dynamic coverage area of a set of all possible devices to be serviced. UE communications manager 615 may dynamically optimize a codebook structure in response to a change in the coverage area.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Transmitter 620 may transmit a signal or an indication of a change in a coverage area to be serviced.

Figure 7:
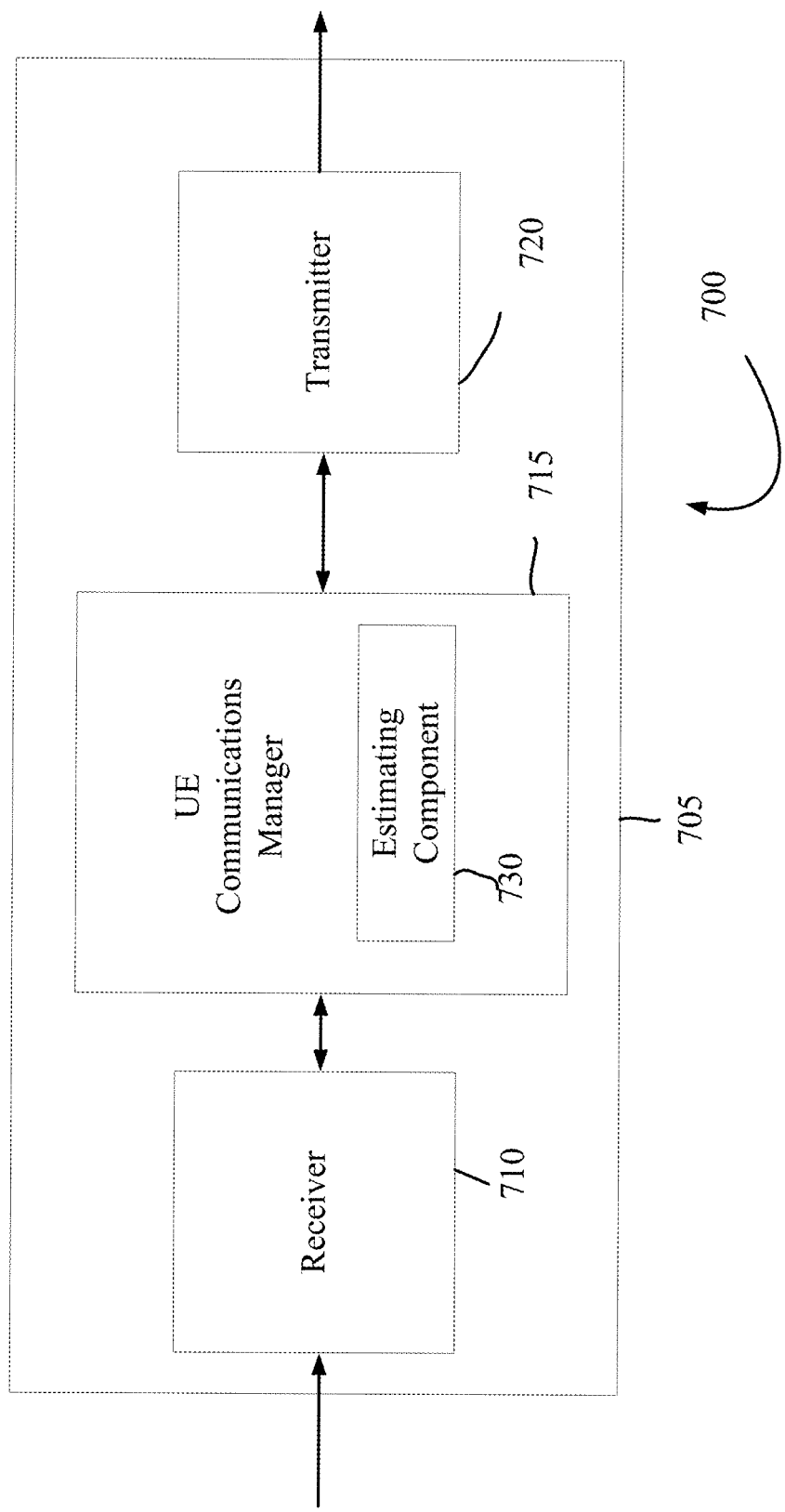
FIG. 7 illustrates a block diagram of a system including a UE that supports techniques for codebook switching with dynamic coverage in accordance with aspects of the present disclosure.

FIG. 7 shows a block diagram 700 of a wireless device 705 that supports techniques for codebook switching with dynamic coverage in accordance with aspects of the present disclosure. Wireless device 705 may be an example of aspects of a wireless device 605 or a UE 115 as described with reference to FIG. 6 or FIG. 1. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and CQI reporting, throughput indicators, priority indicator, etc.) Information may be passed on to other components of the device. The receiver 710 may be an example of aspects of the transceiver 835 described with reference to FIG. 8. The receiver 710 may utilize a single antenna or a set of antennas.

UE communications manager 715 may be an example of aspects of the UE communications manager 615 described with reference to FIG. 6. UE communications manager 715 may also include determining component 730.

Estimating component 730 may estimate a dynamic coverage area of a set of all possible devices to be serviced. Estimating component 730 may dynamically optimize at least one transmission metric in response to a change in coverage area.

Transmitter 720 may transmit signals generated by other components of the device. In some examples, the transmitter 720 may be collocated with a receiver 710 in a transceiver module. For example, the transmitter 720 may be an example of aspects of the transceiver 835 described with reference to FIG. 8. The transmitter 720 may utilize a single antenna or a set of antennas.

Figure 8:
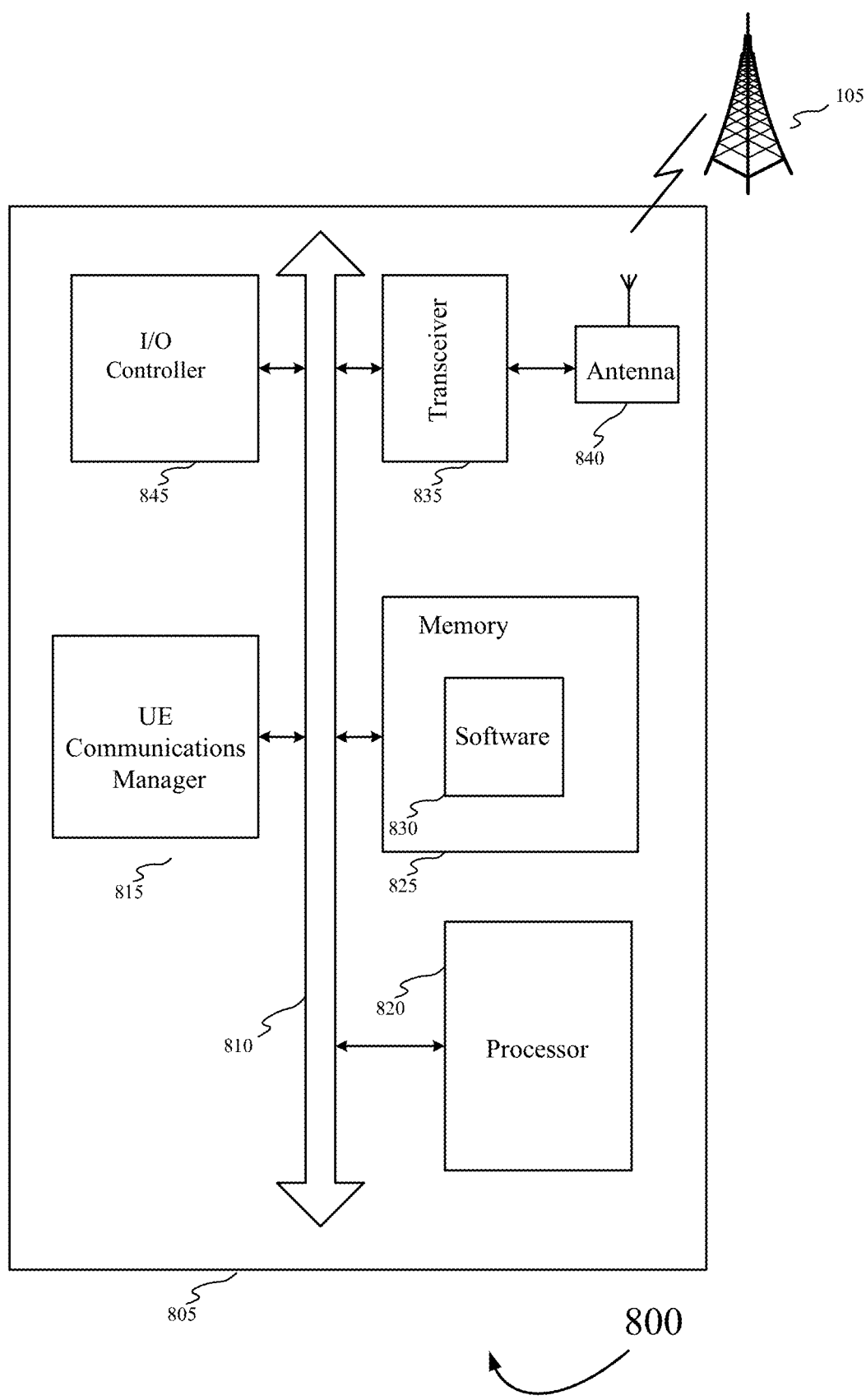
FIG. 8 illustrates a block diagram of a system including a UE and a base station that supports techniques for codebook switching with dynamic coverage in accordance with aspects of the present disclosure.

FIG. 8 shows a diagram of a system 800 including a device 805 that supports techniques for codebook switching with dynamic coverage in accordance with aspects of the present disclosure. Device 805 may be an example of or include the components of wireless device 605, wireless device 705, or a UE 115 as described above, e.g., with reference to FIGS. 6 and 7. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting network aided power saving techniques).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support estimating a dynamic coverage area of a set of all possible devices to be serviced. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
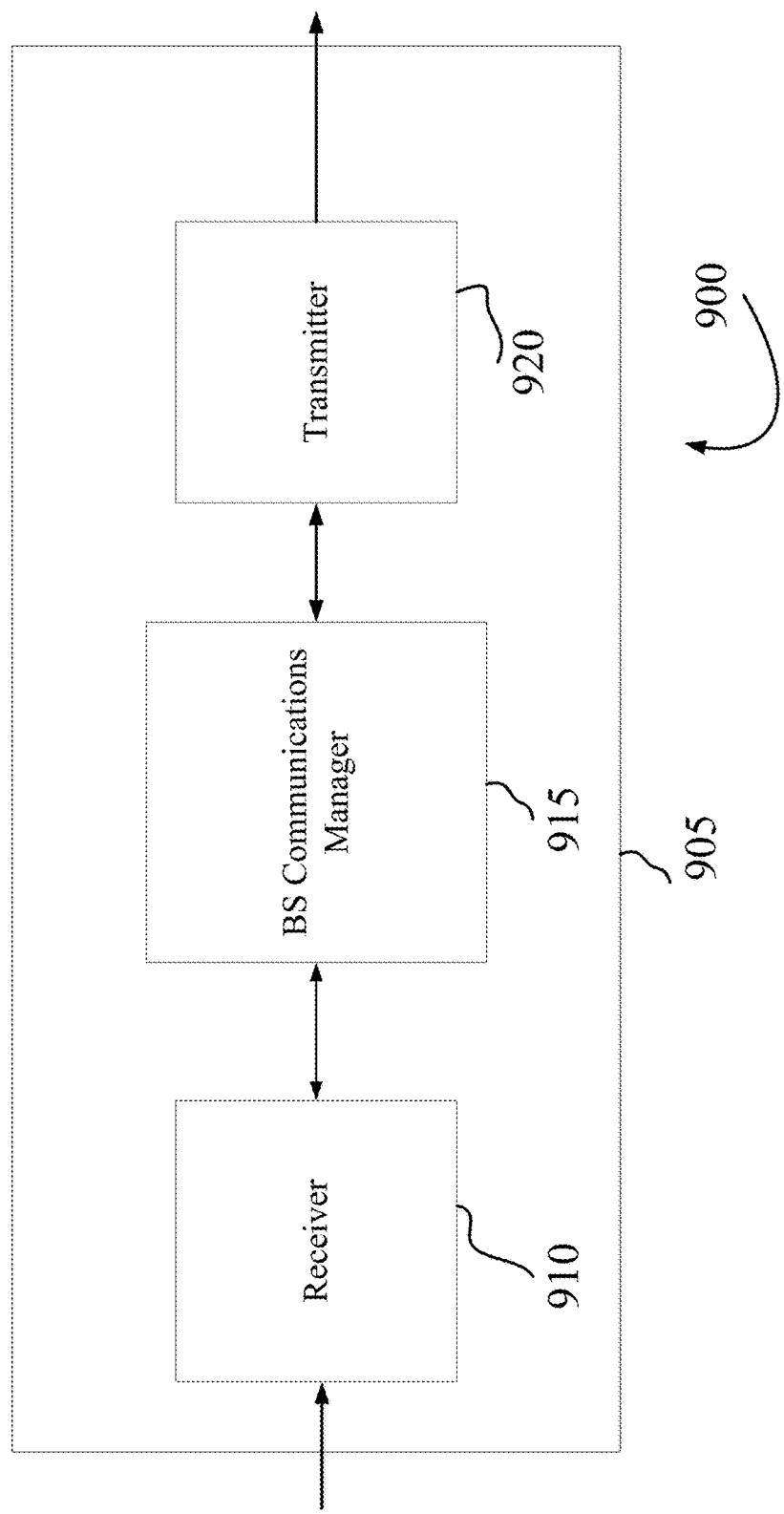
FIG. 9 illustrates a block diagram of a system including a base station that supports techniques for codebook switching with dynamic coverage in accordance with aspects of the present disclosure.

FIG. 9 shows a block diagram 900 of a wireless device 905 that supports techniques for codebook switching with dynamic coverage in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, throughput indicators, or control information associated with various information channels (e.g., control channels, data channels, throughput indicators, priority indicator, etc.) Information may be passed on to other components of the device. The receiver 910 may be an example of aspects of the transceiver 1135 described with reference to FIG. 11. The receiver 910 may utilize a single antenna or a set of antennas.

Receiver 910 may receive signals indicating a dynamic coverage area of a set of all possible UEs to be serviced by the base station, etc.

Base station communications manager 915 may be an example of aspects of the base station communications manager 1015 described with reference to FIG. 10. Base station communications manager 915 and/or at least some of its various sub-components may be implemented in hardware, software executed by a processor, firmware, or any combination thereof If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may receive signals indicating a dynamic coverage area of a set of all possible UEs to be serviced by the base station, etc Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas. Transmitter 920 may transmit a message in accordance with a received priority indicator message.

Figure 10:
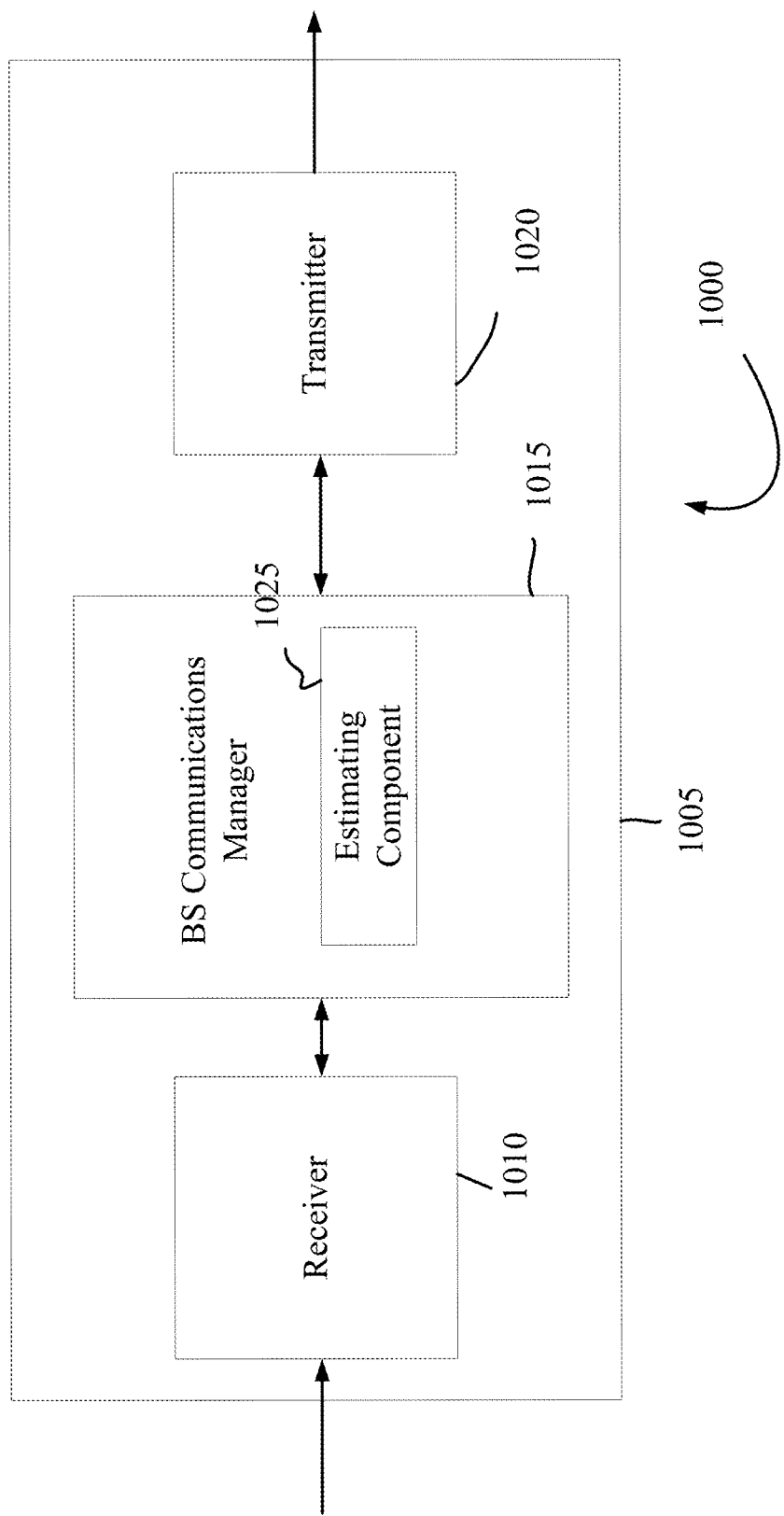
FIG. 10 illustrates a block diagram of a system including a base station that supports techniques for codebook switching with dynamic coverage in accordance with aspects of the present disclosure.

FIG. 10 shows a block diagram 1000 of a wireless device 1005 that supports techniques for codebook switching with dynamic coverage in accordance with aspects of the present disclosure. Wireless device 1005 may be an example of aspects of a wireless device 905 or a base station 105 as described with reference to FIG.1. Wireless device 1005 may include receiver 1010, base station communications manager 1015, and transmitter 1020. Wireless device 1005 may also include a processor. Each of these components may be in communication with one another (e.g., via one or more buses).

BS communications manager 1015 and/or at least some of its various sub-components may be implemented in hardware, software executed by a processor, firmware, or any combination thereof If implemented in software executed by a processor, the functions of the BS communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The BS communications manager 1015 and/or at least some of its various sub-components may be physically located at various positions, including being distributed such that portions of functions are implemented at different physical locations by one or more physical devices. In some examples, BS communications manager 1015 and/or at least some of its various sub-components may be a separate and distinct component in accordance with various aspects of the present disclosure. In other examples, BS communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

BS communications manager 1015 may estimate a dynamic coverage area of a set of all possible UEs to be serviced by the base station. BS communications manager 1015 may include estimating component 1025. Estimating component 1025 may estimate a dynamic coverage area to be serviced by the base station and may dynamically optimize a codebook structure in response to a change in the coverage area.

Transmitter 1020 may transmit signals generated by other components of the device. In some examples, the transmitter 1020 may be collocated with a receiver 1010 in a transceiver module. The transmitter 1020 may utilize a single antenna or a set of antennas. Transmitter 1020 may transmit to a receiving device in accordance with received priority indication information.

Figure 11:
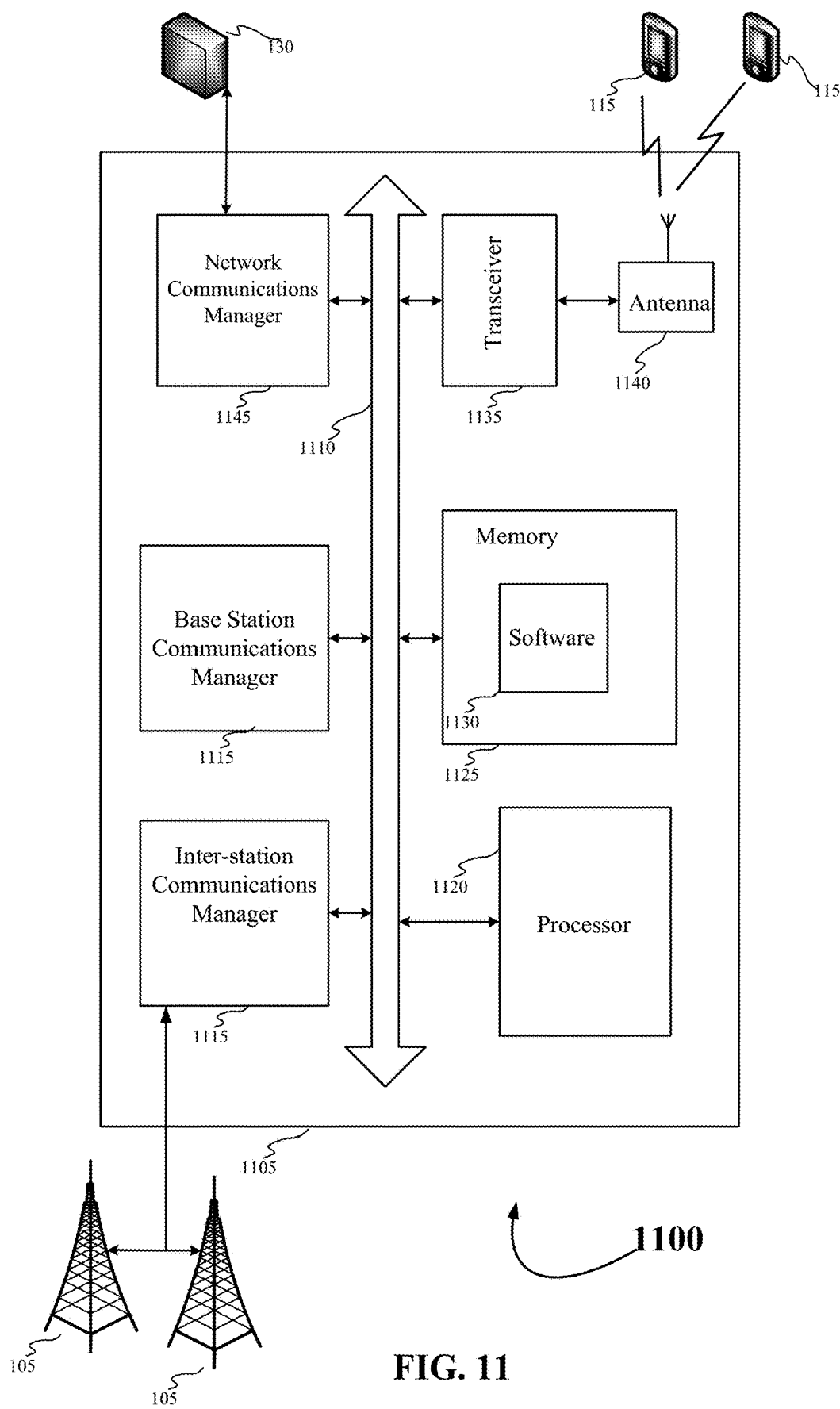
FIG. 11 illustrates a block diagram of a system including a base station and UEs that support techniques for codebook switching with dynamic coverage in accordance with aspects of the present disclosure.

FIG. 11 shows a diagram of a system 1100 including a device 1105 that supports techniques for codebook switching with dynamic coverage in accordance with aspects of the present disclosure. Device 1105 may be an example of or include the components of wireless device 905, wireless device 1005, or a UE 115 as described above, e.g., with reference to FIGS. 9 and 10. Device 1105 may include components for bi-directional voice and data communications including components for transmitting and receiving communications, including base station communications manager 1115, processor 1120, memory 1125, software 1130, transceiver 1135, antenna 1140, and Network Communications Manager 1145. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting network aided power saving techniques).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support estimtaing a dynamic coverage area of a set of all possible devices to be serviced and dynamically optimizing a codebook structure in response to a change in the coverage area. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

The network communications manager 1145 may manage communications with the core network (e.g. via one or more wired backhaul links). For example, the network communications manager 1145 may manage the transfer of data communications for client devices, such as one or more UEs 115.

Figure 12:
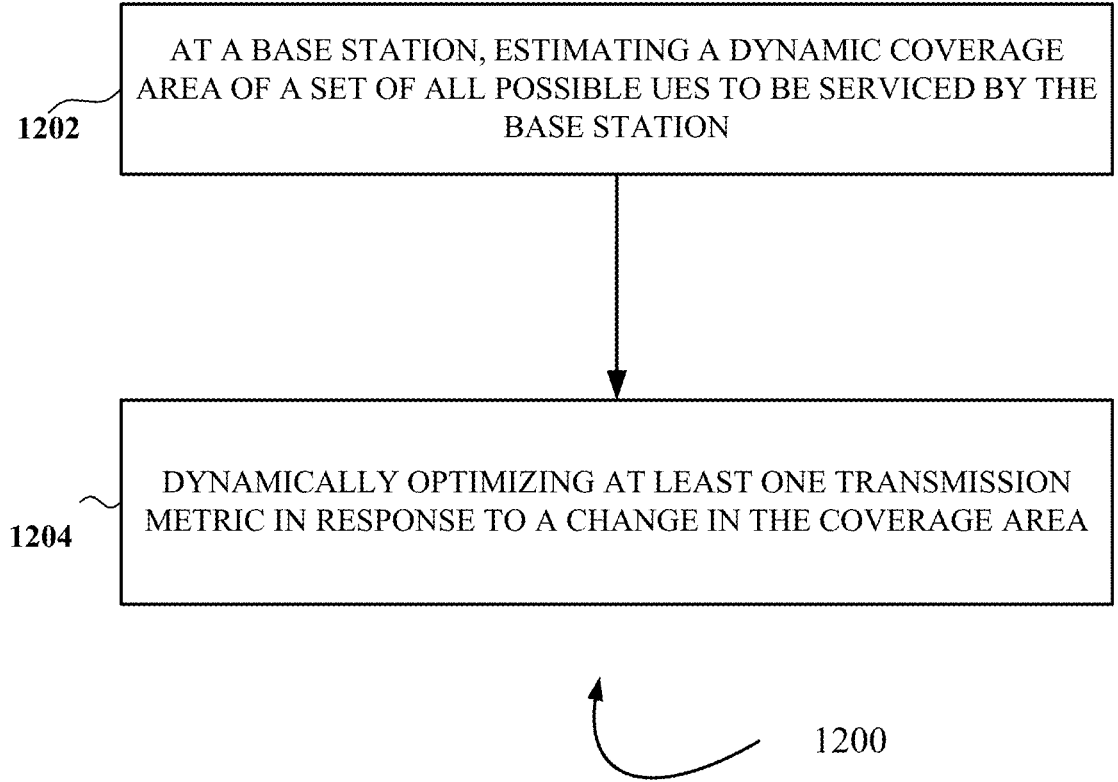
FIGS. 12 illustrates a method or methods at a base station for codebook switching with dynamic coverage in accordance with aspects of the present disclosure.

FIG. 12 shows a flowchart illustrating a method 1200 that supports techniques for codebook switching with dynamic coverage in communications systems in accordance with aspects of the present disclosure. The operations of method 1200 may be implemented by a base station 105 or its components as described herein. In some examples, a base station 105 may execute a set of codes to control the functional elements of the device to perform the functions described below.

At 1202 the base station 105 may estimate a dynamic coverage area of a set of all possible UEs to be serviced by the base station. The operations of 1202 may be performed according to the methods described herein. In certain examples, aspects of the operations of 1202 may be performed by an estimating component as described with reference to FIGS. 10.

At 1204 the base station 105 may dynamically optimize at least one transmission metric in response to a change in the coverage area. The operations of 1204 may be performed according to the methods described herein.

Figure 13:
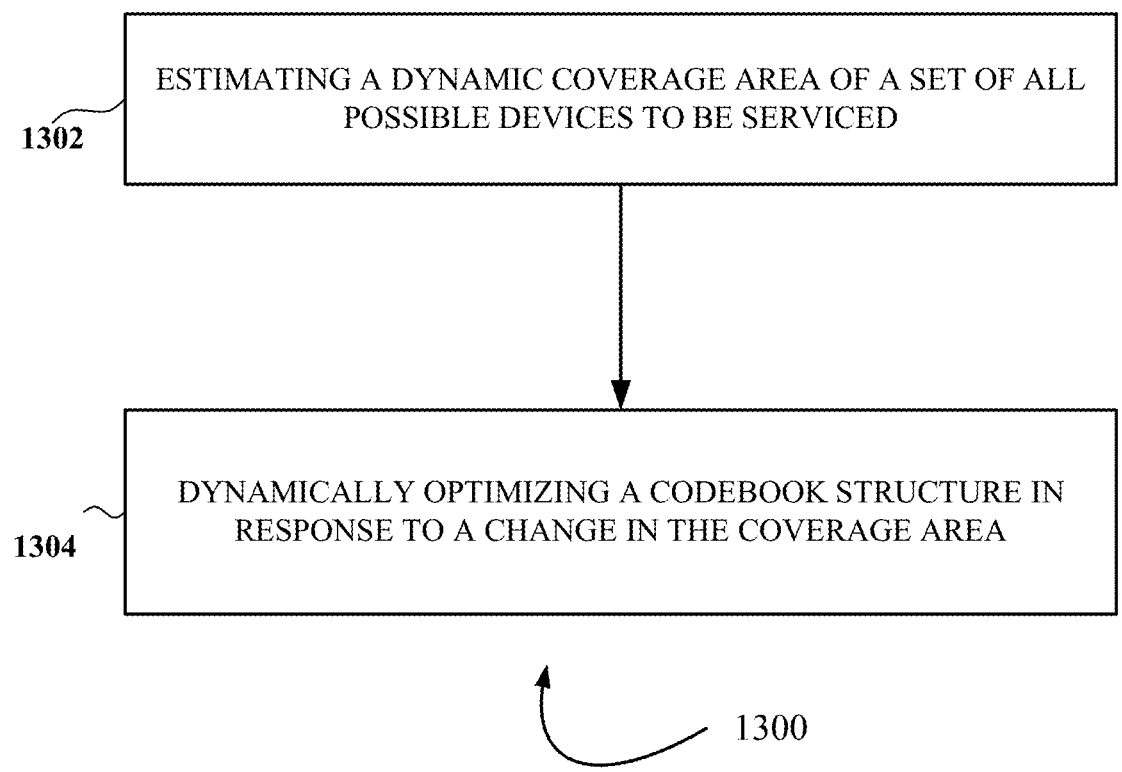
FIGS. 13 illustrates a method or methods at a UE for codebook switching with dynamic coverage in accordance with aspects of the present disclosure.

FIG. 13 shows a flowchart illustrating a method 1300 that supports techniques for codebook switching with dynamic coverage in communications systems in accordance with aspects of the present disclosure. The operations of method 1300 may be implemented by a UE 115 or its components as described herein. For example, the operations of method 1300 may be performed by a UE communications manager as described with reference to FIGS. 6 and 7. In some examples, a UE 115 may execute a set of codes to control the functional elements of the device to perform the functions described below.

At 1302 the UE 115 may estimate a dynamic coverage area of a set of all possible UEs to be serviced. The operations of 1302 may be performed according to the methods described herein. In certain examples, aspects of the operations of 1302 may be performed by a determining component as described with reference to FIG. 7.

At 1304 the UE 115 may dynamically optimize a codebook structure in response to a change in the coverage area. The operations of 1204 may be performed according to the methods described herein.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
at a first millimeter wave (mmW) base station, estimating a dynamic coverage area of the first mmW base station for providing coverage for a set of all possible user equipments (UEs) to be serviced by the first mmW base station, wherein the dynamic coverage area corresponds to a geographic coverage area within which signals can be received from the mmW base station;
selecting at least one transmission metric comprising a codebook of multiple beams to use in transmitting signals to one or more UEs, in response to a change in a size of the dynamic coverage area, wherein transmitting signals using the codebook of multiple beams provides an intended coverage area that is different than the dynamic coverage area; and
discovering at least one new UE in the intended coverage area.

2. The method of claim 1, wherein estimating the dynamic coverage area is based on signaling received from at least a second base station capable of establishing communication with a subset of the set of all possible UEs to be serviced by the first base station.

3. The method of claim 2, wherein the estimating is based on at least one of handover statistics or link loss statistics due to blockage.

4. The method of claim 1, wherein selecting the at least one transmission metric is based on determining a subset of the set of all possible UEs to be serviced by the first base station.

5. The method of claim 4, further comprising:
determining the subset of the set of all possible UEs based on a priority parameter.

6. The method of claim 1, further comprising:
dynamically loading the codebook to memory.

7. The method of claim 1, wherein selecting the at least one transmission metric is a function of at least one parameter selected from the group consisting of antenna dimensions of the first base station, the intended coverage area, and a metric capturing a performance of the codebook.

8. The method of claim 7, wherein the metric capturing the performance of the codebook is at least one of a mean array gain, a worst-case array gain, or a certain percentile in a distribution function of an array gain over the dynamic coverage area.

9. A method for wireless communication, comprising:
estimating a dynamic coverage area of a millimeter wave (mmW) base station for providing coverage for a set of all possible user equipments (UEs) to be serviced by the mmW base station, wherein the dynamic coverage area corresponds to a geographic coverage area within which signals can be received from the mmW base station;
selecting a codebook structure of a codebook of multiple beams to use in transmitting signals to one or more UEs in response to a change in a size of the dynamic coverage area, wherein transmitting signals using the codebook of multiple beams provides an intended coverage area that is different than the dynamic coverage area; and
discovering at least one new UE in the intended coverage area.

10. An apparatus for wireless communication, comprising:
means for estimating a dynamic coverage area of a first millimeter wave (mmW) base station for providing coverage for a set of all possible user equipments (UEs) to be serviced by the first mmW base station, wherein the dynamic coverage area corresponds to a geographic coverage area within which signals can be received from the mmW base station;
means for selecting at least one transmission metric comprising a codebook of multiple beams to use in transmitting signals to one or more UEs, in response to a change in a size of the dynamic coverage area, wherein transmitting signals using the codebook of multiple beams provides an intended coverage area that is different than the dynamic coverage area; and
means for discovering at least one new UE in the intended coverage area.

11. The apparatus of claim 10, wherein the means for estimating the dynamic coverage area further comprises:
means for determining a use-case of the set of all possible user equipments to be serviced by the first mmW base station; and
means for hard-coding a metric corresponding to the use case.

12. The apparatus of claim 10, wherein the means for estimating the dynamic coverage area is based on signaling received from at least a second base station capable of establishing communication with a subset of the set of all possible UEs to be serviced by the first mmW base station.

13. The apparatus of claim 12, wherein the means for estimating is based on at least one of handover statistics or link loss statistics due to blockage.

14. The apparatus of claim 10, wherein the means for selecting the at least one transmission metric is based on determining a subset of the set of all possible UEs to be serviced by the first base station.

15. The apparatus of claim 14, further comprising:
means for determining the subset of the set of all possible UEs based on one of a priority parameter.

16. The apparatus of claim 10, further comprising:
means for dynamically loading the codebook to memory.

17. The apparatus of claim 10, wherein the means for selecting the at least one transmission metric is a function of at least one parameter selected from the group consisting of antenna dimensions of the first base station, the intended coverage area, and a metric capturing a performance of the codebook.

18. The apparatus of claim 17, wherein the metric capturing the performance of the codebook is at least one of a mean array gain, a worst-case array gain, or a certain percentile in a distribution function of an array gain over the dynamic coverage area.

19. An apparatus for wireless communication, comprising:
means for estimating a dynamic coverage area of a millimeter wave (mmW) base station for providing coverage for a set of all possible user equipments (UEs) to be serviced by the mmW base station, wherein the dynamic coverage area corresponds to a geographic coverage area within which signals can be received from the mmW base station;
means for selecting a codebook structure of a codebook of multiple beams to use in transmitting signals to one or more UEs in response to a change in a size of the dynamic coverage area, wherein transmitting signals using the codebook of multiple beams provides an intended coverage area that is different than the dynamic coverage area; and
means for discovering at least one new UE in the intended coverage area.

20. An apparatus for wireless communication, comprising:
   a transceiver;
   a memory configured to store instructions; and
   one or more processors communicatively coupled with the transceiver and the memory, wherein the one or more processors are configured to:
      at a first millimeter wave (mmW) base station, estimate a dynamic coverage area of the first mmW base station for providing coverage for a set of all possible user equipments (UEs) to be serviced by the first mmW base station, wherein the dynamic coverage area corresponds to a geographic coverage area within which signals can be received from the mmW base station;
      select at least one transmission metric comprising a codebook of multiple beams to use in transmitting signals to one or more UEs, in response to a change in a size of the dynamic coverage area, wherein transmitting signals using the codebook of multiple beams provides an intended coverage area that is different than the dynamic coverage area; and
      discover at least one new UE in the intended coverage area.

21. The apparatus of claim 20, wherein the one or more processors configured to estimate the dynamic coverage area is further configured to:
   determine a use-case of the set of all possible user equipments to be serviced by the first mmW base station; and
   hard-code a metric corresponding to the use case.

22. The apparatus of claim 20, wherein the one or more processors are further configured to estimate the dynamic coverage area based on signaling received from at least a second base station capable of establishing communication with a subset of the set of all possible UEs to be serviced by the first base station.

23. An apparatus for wireless communication, comprising:
   a transceiver;
   a memory configured to store instructions; and
   one or more processors communicatively coupled with the transceiver and the memory, wherein the one or more processors are configured to:
      estimate a dynamic coverage area of a millimeter wave (mmW) base station for providing coverage for a set of all possible user equipments (UEs) to be serviced by the a mmW base station, wherein the dynamic coverage area corresponds to a geographic coverage area within which signals can be received from the mmW base station;
      dynamically optimize a codebook structure of a codebook of multiple beams to use in transmitting signals to one or more UEs in response to a change in a size of the dynamic coverage area, wherein transmitting signals using the codebook of multiple beams provides an intended coverage area that is different than the dynamic coverage area; and
      discover at least one new UE in the intended coverage area.

24. A non-transitory computer-readable medium, comprising code executable by one or more processors for wireless communications, the code comprising code for:
   at a first millimeter wave (mmW) base station, estimating a dynamic coverage area of the first mmW base station for providing coverage for a set of all possible user equipments (UEs) to be serviced by the first mmW base station, wherein the dynamic coverage area corresponds to a geographic coverage area within which signals can be received from the mmW base station;
   selecting at least one transmission metric comprising a codebook of multiple beams to use in transmitting signals to one or more UEs, in response to a change in a size of the dynamic coverage area, wherein transmitting signals using the codebook of multiple beams provides an intended coverage area that is different than the dynamic coverage area; and
   discovering at least one new UE in the intended coverage area.

25. The non-transitory computer-readable medium of claim 24, wherein estimating the dynamic coverage area further comprises:
   determining a use-case of the set of all possible user equipments to be serviced by the first mmW base station; and
   hard-coding a metric corresponding to the use case.

26. The non-transitory computer-readable medium of claim 24, wherein estimating the dynamic coverage area is based on signaling received from at least a second base station capable of establishing communication with a subset of the set of all possible UEs to be serviced by the first mmW base station.

27. A non-transitory computer-readable medium, comprising code executable by one or more processors for wireless communications, the code comprising code for:
   estimating a dynamic coverage area of a millimeter wave (mmW) base station for providing coverage for a set of all possible user equipments (UEs) to be serviced by a mmW base station,. wherein the dynamic coverage area corresponds to a geographic coverage area within which signals can be received from the mmW base station;
   selecting a codebook structure of a codebook of multiple beams to use in transmitting signals to one or more UEs in response to a change in a size of the dynamic coverage area, wherein transmitting signals using the codebook of multiple beams provides an intended coverage area that is different than the dynamic coverage area; and
   discovering at least one new UE in the intended coverage area.

\* \* \* \* \*